Patented May 4, 1937

2,079,507

UNITED STATES PATENT OFFICE 2,079,507

CATALYST

Edward S. Johnson, New Rochelle, N. Y., assignor to The Calco Chemical Co., Inc., Bound Brook, N. J., a corporation of Delaware No Drawing. Application February 13, 1935, Serial No. 6,397

10 Claims.  (Cl. 23—234)

This invention relates to new catalysts containing vanadium for catalytic vapor phase oxidations and more particularly to new vanadium catalysts for the contact sulphuric acid process.

In the past a number of carriers have been used for vanadium catalysts for various catalytic oxidations and particularly for the contact sulphuric acid process. Three general types of carriers have been developed, first, finely divided materials, such as kieselguhr, etc., which are impregnated with a catalytic material and then formed into pellets; second, massive fragments of various inert materials, such as for example diatomite brick fragments suitably calcined in order to remove their friability; and third type various gels.

Commercial silica gel has been tried but has proved a poor carrier for vanadium catalysts. A series of gels having base exchange properties, such as zeolites and non-silicious base exchange bodies, have found extensive commercial use and are described for example in patents to A. O. Jaeger, 1,657,754, 1,675,308, 1,675,309 and 1,694,123. These gel carriers while highly effective by reason of their microporous structure have, in some cases, contained too much alkali and are relatively expensive.

In my co-pending application Serial No. 687,010, filed Aug. 26, 1933, I have described and claimed a new silica gel prepared in an alkaline instead of an acid medium. According to the present invention, I have found that this alkaline silica gel which has been prepared under conditions nonacid to Congo constitutes a carrier of extraordinary efficiency for vanadium catalysts particularly for vanadium catalysts for the contact sulphuric acid process. The efficiency of vanadium catalysts mounted on or impregnated in fragments of this alkaline silica gel far surpasses the efficiency of vanadium catalysts on ordinary silica gel obtained in an acid medium and the catalysts produced are equal to the best base exchange catalysts.

The alkaline silica gel may be prepared according to any of the examples of my co-pending application above referred to, but in general two main precautions have to be adopted. First, the temperature has to be kept low, preferably about 0° C. and second the potassium or sodium silicate solution used as a raw material must be diluted.

The gel after preparation and removal of mother liquor may be treated with suitable catalyst solutions or it may first be dried. When the gel is dried its absorptive powers are very high, but in many cases all of the catalyst solution must be introduced in a single impregnation otherwise if a second impregnation is tried the gel tends to shatter and disintegrate into sand-like particles. When, however, the gel is not completely dried prior to impregnation, the impregnation may take place in two stages and for catalysts which are to carry a maximum of vanadium this procedure has advantages, although it suffers from the disadvantage of being more time consuming and requiring two treatments instead of one, thus increasing the cost of the final catalyst. Both modifications are included in the present invention and the particular modification to be chosen in any given instance will be dictated by the technical requirements, costs, etc.

Impregnation may be with any suitable solution of a vanadium compound, but for most purposes it is desirable to introduce the vanadium in the form of ammonium vanadate in which form it is cheaply obtainable on the market. Other forms of soluble vanadium compounds, such as vanadyl sulphate, may, of course, be employed wherever desired.

When the catalyst is to be used for the contact sulphuric acid process or for certain delicate organic oxidations, a promoter is required in the first case and a stabilizer in the second. The best promoters for the contact sulphuric acid process are compounds of potassium, caesium, rubidium and thallium. Compounds of sodium while having promoting action are less effective. For stabilization in certain organic reactions the alkali metals are more or less interchangeable and for certain other organic reactions permitting a more active catalyst, such as for example the catalytic oxidation of naphthalene, compounds of other metals, such as copper, silver and the like, are effective.

The high porosity of the alkaline silica gel carrier of the present invention may be considered as a physical promoter and highly active catalysts are obtained with a minimum of vanadium. This is particularly true in the contact sulphuric acid process where the catalysts of the present invention find their most important field of usefulness.

The invention will be described in greater detail in the following specific examples, which illustrate typical catalysts embodying various features of the invention.

Example I

An alkaline silica gel is prepared by diluting 25 liters of a potassium silicate solution containing 21.8% $SiO_2$ and 10.5% KOH equivalent with 35 liters of water, cooling to 0° C. and adding 14 liters of 13% sulphuric acid also cooled to 0° C. Vigorous agitation is maintained and care is taken to prevent local overheating. The gel rapidly sets to a clear or slightly turbid product and on standing begins to sweat, shrinks away from the reaction vessel and cracks open. After a number of hours, a mother liquor is formed and is poured off. The gel is then permitted to stand for some time in order to age and partially dry and then is broken into suitable fragments and washed.

The gel thus prepared is treated with a solution of ammonium vanadate and potassium sulphate in the proportion of one mol. of vanadium to three of potassium. The gel absorbs the solution, bleaching the yellow color, probably by adsorption of free vanadic acid. After complete adsorption the liquor is removed and gel dried resulting in slight fissuring. The catalyst is again treated with the vanadium-potassium solution and adsorbs a further amount of catalyst solution, but the adsorption is not sufficiently great to bleach the yellowish color. This is probably due to the fact that in the first saturation most of the vanadium has been already adsorbed.

After the second saturation the gel is dried and shows a gain of vanadium and potassium salts of 4.7 parts per 16.4 parts of $SiO_2$ in the gel. The catalyst shows substantially 98% conversion efficiency when used in the contact sulphuric acid process, at commercial loadings.

*Example II*

A gel as prepared in Example I is dried to about 25% of $SiO_2$ as against about 12½% $SiO_2$ in the gel of Example I. The gel fragments are soaked in a solution of ammonium vanadate and potassium sulphate containing 5% ammonium vanadate, 11% potassium sulphate and 84% of water. The gel fragments are permitted to soak for 20–24 hours and are then dried. The absorption at the beginning is very rapid with evolution of gas from pores of the gel resulting in sufficient effervescence to float the gel particles to the top of the solution. The yellowish color of the ammonium vanadate-potassium sulphate solution is completely bleached, and practically no disintegration of the gel is observable. When tested as a sulphuric acid catalyst the results were substantially as in Example I.

*Example III*

A gel as prepared in Example I is dried at 21% $SiO_2$ at 60–70° C. It is then soaked for 12 hours in the ammonium vanadate-potassium sulphate solution and dried at 60–70° C. A saturated ammonium vanadate-potassium sulphate solution is then prepared and the gel soaked for a short time. The disintegration is only slight. The percent of vanadium adsorbed by the catalyst is about 3.75 and when tested, in the contact sulphuric acid process, conversions of over 98% are obtained at half commercial loadings even at 425° C. with similar conversion percentages at full commercial loading under the normal temperature gradient for sulphuric acid catalysis.

The catalyst described is also suitable for the catalytic oxidation of naphthalene to alphanapthaquinone when the catalyst used in a bath cooled converter where careful temperature control is assured.

*Example IV*

200 liters of a commercial sodium silicate solution of the usual strength, about 30° Bé. are diluted with 480 liters of water and cooled approximately 0° C. Care should be taken not to go much below 0° C. as there is danger of sodium silicate crystallizing out. 204 liters of 13% sulfuric acid are cooled at 0° C. and stirred into the diluted sodium silicate solution, the whole being maintained at the low temperature. In about 3 minutes the mixture becomes cloudy and at the end of 6 minutes the gel sets.

After standing sufficiently the mother liquor is poured off and after aging and partially drying the gel is broken into suitable fragments and washed. This gel is treated as described in Example III above and a catalyst is obtained which has substantially the same activity in the contact sulphuric acid process.

*Example V*

A catalyst is prepared as described in Example III, but instead of using potassium sulphate an equivalent amount of rubidium or caesium sulphate is used. The catalyst obtained shows somewhat higher activity at low temperatures giving 98% or over at loadings substantially up to commercial.

The term "silica gel" is used to cover a gel consisting substantially of $SiO_2$ or silicic acid. It does not include any base exchanging polysilicates which are not substantially silica or silicic acid.

I claim:

1. A catalyst for vapor phase catalytic oxidations comprising a vanadium compound carried by massive fragments of a microporous silica gel which is obtained by the acidification of alkali metal silicate solutions under conditions which are non-acid to Congo.

2. A catalyst for catalytic vapor phase oxidations according to claim 1 in which the vanadium compound is associated with a promoter.

3. A catalyst for the catalytic vapor phase oxidations according to claim 1 in which the vanadium compound is associated with the compound of an element included in the group consisting of potassium, rubidium, caesium and thallium.

4. A catalyst for the catalytic vapor phase oxidations according to claim 1 in which the vanadium compound is associated with the compound of an element included in the group consisting of potassium, rubidium, caesium and thallium, the molecular proportion of the vanadium compound to the other compound being approximately 1 to 3.

5. A catalyst for the catalytic vapor phase oxidations comprising vanadic oxide associated with potassium sulphate on a carrier consisting of massive fragments of microporous silica gel obtained by acidification of an alkaline metal silicate under conditions which are at all times non-acid to Congo.

6. A catalyst according to claim 5 in which the molecular proportion of vanadic acid to potassium sulphate is approximately 1 to 3.

7. A method of producing a catalyst for vapor phase catalytic oxidations which comprises preparing massive fragments of a microporous silica gel by the acidification of alkali metal silicate under conditions which are at all times non-acid to Congo, drying said gel to an $SiO_2$ content about 20% and subjecting the gel fragments to the action of a solution of a vanadium compound and a compound of an element included in the class consisting of potassium, rubidium, caesium and thallium, and drying the impregnated gel.

8. A method of preparing a catalyst according to claim 7 in which the solution of ammonium vanadate and potassium sulphate is in the molecular proportion of approximately 1 to 3.

9. A method of producing a catalyst for vapor phase catalytic oxidations which comprises preparing massive fragments of a microporous silica gel obtained by acidification of an alkali metal silicate under conditions which are at all times non-acid to Congo, and subjecting said fragments without drying to an $SiO_2$ content materially in excess of 21% to impregnation by a solution of a vanadium compound and a compound of an element included in the group consisting of potassium, rubidium, caesium and thallium, drying the impregnated gel fragments and subjecting them to a second impregnation of a similar solution, the concentration of which is high enough to prevent disintegration of the gel fragments and again drying the gel fragments.

10. A method of preparing a catalyst according to claim 9 in which the solution is of ammonium vanadate and potassium sulphate in approximate proportion of one mol. of ammonium vanadate to three mols of potassium sulphate.

EDWARD S. JOHNSON.